(12) United States Patent
Krishnamurthy et al.

(10) Patent No.: US 9,510,328 B2
(45) Date of Patent: Nov. 29, 2016

(54) REDUCING THE EFFECTS OF INTERFERENCE EXPERIENCED BY A COMMUNICATION DEVICE

(71) Applicant: Google Technology Holdings LLC, Mountain View, CA (US)

(72) Inventors: Sandeep H. Krishnamurthy, Mountain View, CA (US); Hyejung Jung, Palatine, IL (US); Murali Narasimha, Lake Zurich, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 529 days.

(21) Appl. No.: 13/869,084

(22) Filed: Apr. 24, 2013

(65) Prior Publication Data
US 2013/0315157 A1    Nov. 28, 2013

Related U.S. Application Data

(60) Provisional application No. 61/651,762, filed on May 25, 2012.

(51) Int. Cl.
*H04W 72/04* (2009.01)
*H04L 5/00* (2006.01)
(Continued)

(52) U.S. Cl.
CPC .......... *H04W 72/0406* (2013.01); *H04L 5/001* (2013.01); *H04L 5/0048* (2013.01); *H04L 5/0053* (2013.01); *H04L 5/0098* (2013.01); *H04W 24/10* (2013.01); *H04W 68/02* (2013.01);
(Continued)

(58) Field of Classification Search
CPC . H04L 47/527; H04L 5/0053; H04L 5/0098; H04L 5/001; H04L 5/48; H04L 5/0073; H04W 72/0406; H04W 24/10; H04W 68/02; H04W 28/18; H04W 36/0083
See application file for complete search history.

(56) References Cited

U.S. PATENT DOCUMENTS

2008/0031172 A1* 2/2008 Nanda ............... H04W 72/0426
370/310.1
2010/0202382 A1   8/2010 Park et al.
(Continued)

FOREIGN PATENT DOCUMENTS

EP         2574094        3/2013
WO    2011135916 A1    11/2011
(Continued)

OTHER PUBLICATIONS

Tubbax, J.; Come, B.; Van der Perre, L.; Donnay, S.; Engels, M.; Hugo De Man; Moonen, M., "Compensation of IQ imbalance and phase noise in OFDM systems," IEEE Trans. Wireless Communications, vol. 4, Issue 3, May 2005.
(Continued)

*Primary Examiner* — Jianye Wu
(74) *Attorney, Agent, or Firm* — Faegre Baker Daniels LLP

(57) ABSTRACT

Disclosed are methods for allowing a wireless communication device (or "user equipment" or "UE") to receive signaling information when there is a power imbalance between a primary cell ("Pcell") and a New Carrier Type ("NCT") secondary cell ("Scell"). In one aspect, the UE reduces its downlink bandwidth to cover only a carrier of the Pcell, receives control signaling information, if present, and then increases its bandwidth to cover carriers of both the Pcell and Scell.

12 Claims, 8 Drawing Sheets

(51) Int. Cl.
H04W 24/10 (2009.01)
H04W 68/02 (2009.01)
H04W 28/18 (2009.01)
H04W 36/00 (2009.01)
H04W 68/08 (2009.01)

(52) U.S. Cl.
CPC ............. *H04L 5/0073* (2013.01); *H04W 28/18* (2013.01); *H04W 36/0083* (2013.01); *H04W 68/08* (2013.01)

(56) References Cited

U.S. PATENT DOCUMENTS

| | | | |
|---|---|---|---|
| 2011/0075621 A1* | 3/2011 | Sung | H04W 48/12 370/329 |
| 2011/0243106 A1 | 10/2011 | Hsu et al. | |
| 2011/0267955 A1 | 11/2011 | Dalsgaard | |
| 2011/0292854 A1 | 12/2011 | Terry et al. | |
| 2012/0057539 A1 | 3/2012 | Kuo | |
| 2012/0115469 A1* | 5/2012 | Chen | H04W 36/0094 455/434 |
| 2012/0122472 A1* | 5/2012 | Krishnamurthy | H04L 5/0053 455/456.1 |
| 2012/0263054 A1* | 10/2012 | Kazmi | H04W 24/10 370/252 |
| 2013/0010641 A1 | 1/2013 | Dinan | |
| 2013/0039268 A1* | 2/2013 | Blankenship | H04W 56/0015 370/328 |
| 2013/0107743 A1 | 5/2013 | Ishii et al. | |
| 2013/0128765 A1* | 5/2013 | Yang | H04W 24/00 370/252 |
| 2014/0192663 A1* | 7/2014 | Rosa | H04W 52/244 370/252 |

FOREIGN PATENT DOCUMENTS

| | | |
|---|---|---|
| WO | 2011149920 A2 | 12/2011 |
| WO | 2012008691 A2 | 1/2012 |

OTHER PUBLICATIONS

Qiyue Zou, Alireza Tarighat, and Ali H. Sayed, "Joint Compensation of IQ Imbalance and Phase Noise in OFDM Systems," Proc. 40th Asilomar Conference on Signals, Systems and Computers, Pacific Grove, CA, Oct. 2006.

Patent Cooperation Treaty, International Search Report and Written Opinion of the International Searching Authority for International Application No. PCT/US2013/037990, Jan. 21, 2014, 18 pages.

Nokia, Nokia Siemens Network: "Image Rejections in intraband carrier aggregation", 3GPP TSG-RAN WG4 Meeting 2010 AH#4, R4-103677, Xi'an, China, Oct. 11-15, 2010, all pages.

ST-Ericsson, Erisson: "Test scenario for power imbalance under CA deployment", 3GPP TSG RAN WG4 Meeting 62, R4-120326, Dresden, Germany Feb. 6-10, 2012, all pages.

Renesas Mobile Europe Ltd.: "System simulation results for demodulation requirement with power imbalance", 3GPP TSG-RAN WG4 Meeting #62, R4-120532, Dresden, Germany, Feb. 6-10, 2012, all pages.

Motorola: "DRX in LTE-A", 3GPP TSG RAN2#66bis, R2-093914, Los Angeles, USA, Jun. 29-Jul. 3, 2009, all pages.

* cited by examiner

REDUCING THE EFFECTS OF INTERFERENCE EXPERIENCED BY A COMMUNICATION DEVICE

CROSS-REFERENCE TO RELATED APPLICATIONS

The present application claims priority to U.S. Provisional Patent Application 61/651,762, filed on May 25, 2012, and incorporated herein by reference.

TECHNICAL FIELD

The present disclosure is related generally to wireless communications and, more particularly, to reducing the effects of interference.

BACKGROUND

It is becoming increasingly common for wireless communication networks to deploy multiple types of transmission points. At times, it is necessary to have both primary transmission points, with a full range of capabilities, and secondary transmission points, which may be cheaper though less capable. One challenge of this arrangement is making sure that the transmission points do not interfere with one another. Another challenge is making sure that, to whatever extent possible, the secondary, less-expensive transmission point carries the bulk of the data traffic and that communication devices operating in the network are still able to receive the benefit of the higher level capabilities that may only be found in the primary transmission points without compromising communication with secondary transmission points.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
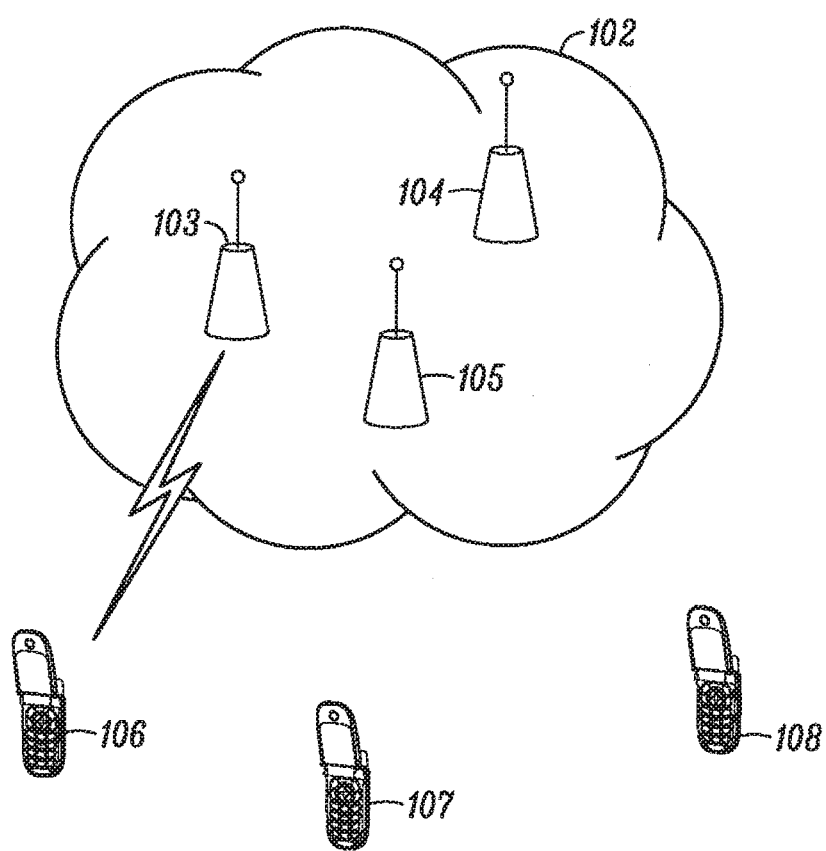
FIG. 1 is an overview of a representative network in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

An example of a network in which an embodiment of the invention operates is now described. FIG. 1 illustrates a communication system including a network 102, transmission points ("TPs") 103, 104, and 105 (which may be implemented within eNBs or Remote Radio Heads ("RRHs")), and UE 106, 107, and 108. Various communication devices may exchange data or information through the network 102. The network 102 may be an Evolved-Universal Terrestrial Radio Access or other type of telecommunication network. A network entity, such as one of the TPs 103, 104, and 105, may assign a UE identifier to one ore more of the UEs 106, 107, and 108 when the UE first joins the network 102. For one embodiment, a TP may be a distributed set of servers in the network 102. In another embodiment, a TP may correspond to a set of geographically collocated or proximal physical antenna elements. A UE may be one of several types of handheld or mobile devices, such as a mobile phone, a laptop, or a personal digital assistant. In one embodiment, the UE may be a wireless local area network capable device, a wireless wide area network capable device, or any other wireless device. A TP may have one or more transmitters and one or more receivers. The number of transmitters at a TP may be related, for example, to the number of transmit antennas at the TP. Similarly, a UE may have multiple receive antennas communicating with one or more of the TPs. Each antenna port may carry signals to a UE from a TP and from the TP to the UE. Each antenna port may also receive these signals.

Figure 2:
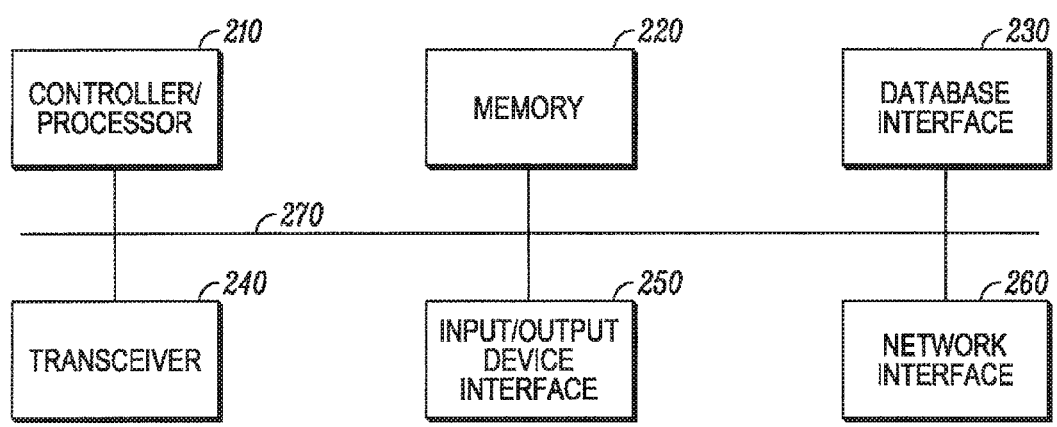
FIG. 2 is a generalized schematic of a representative transmission point of FIG. 1.

FIG. 2 illustrates a possible configuration of a computing system to act as a TP (e.g., one or more of the TPs in FIG. 1). The TP may include a processor/controller 210, a memory 220, a database interface 230, a transceiver 240, an input/output ("I/O") device interface 250, and a network interface 260, connected through a bus 270. The TP may implement any operating system, such as Microsoft Windows®, UNIX, or LINUX. Client and server software may be written in any programming language, such as C, C++, Java, or Visual Basic, for example. The server software may run on an application framework, such as a Java® server or .NET® framework.

The processor 210 may be any programmable processor. The subject of the disclosure may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this disclosure.

The memory 220 may include volatile and nonvolatile data storage, including one or more electrical, magnetic, or optical memories such as a random access memory, cache, hard drive, or other memory device. The memory may have a cache to speed access to specific data. The memory 220 may also be connected to a compact disc—read only memory, digital video disc—read only memory, DVD read write input, tape drive, or other removable memory device that allows media content to be directly uploaded into the system. Data may be stored in the memory 220 or in a separate database. The database interface 230 may be used by the processor 210 to access the database. The database may contain any formatting data to connect a UE to the network 102 (FIG. 1). The transceiver 240 may create a data connection with the UE.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network 102. The network connection interface 260 may be used to connect a client device to a network. The components of the TP may be connected via an electrical bus 270, for example, or linked wirelessly.

Client software and databases may be accessed by the processor 210 from memory 220 and may include, for example, database applications, word processing applications, as well as components that embody the decision support functionality of the present disclosure.

Figure 3:
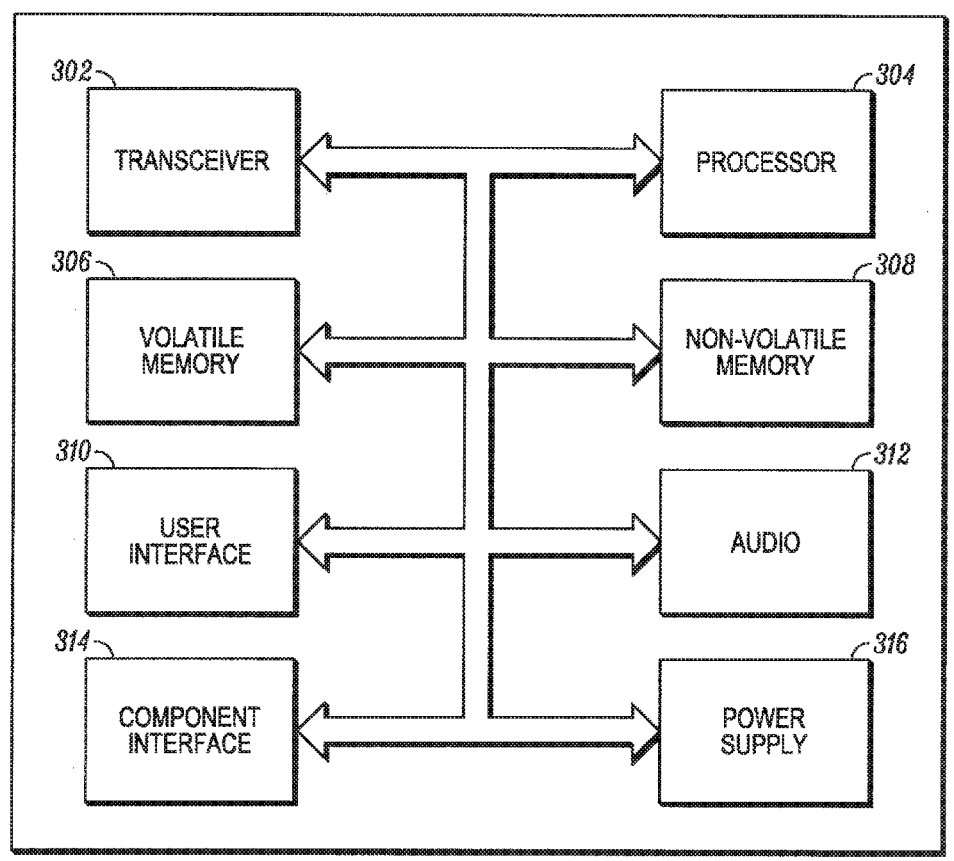
FIG. 3 is a schematic of a representative user equipment ("UE") device.

FIG. 3 illustrates in a block diagram one embodiment of a telecommunication apparatus or electronic device to act as a UE (such as one or more of the UEs depicted in FIG. 1). The UE may be capable of accessing the information or data stored in the network 102. For some embodiments of the disclosure, the UE may also support one or more applications for performing various communications with the network 102. The UE may be a handheld device, such as, a mobile phone, a laptop, or a personal digital assistant. For some embodiments, the UE may be WiFi® capable device, which may be used to access the network 102 for data or by voice using VOIP.

The UE may include a transceiver 302, which is capable of sending and receiving data over the network 102. The UE may include a processor 304 that executes stored programs. The UE may also include a volatile memory 306 and a non-volatile memory 308 which are used by the processor 304. The UE may include a user input interface 310 that may comprise elements such as a keypad, display, touch screen, and the like. The UE may also include a user output device that may comprise a display screen and an audio interface 312 that may comprise elements such as a microphone, earphone, and speaker. The UE also may include a component interface 314 to which additional elements may be attached, for example, a universal serial bus interface. Finally, the UE may include a power supply 316.

Referring again to FIG. 1, the general mode of communication between the TP 103 and the UE 106 according to an embodiment of the invention is now described. The TP 103 and the UE 106 generally communicate via uplink channels and downlink channels. The physical medium used is RF signals, which are encoded using Orthogonal Frequency-Division Multiplexing ("OFDM"). The modulation scheme used by the TP 103 and the UE 106 differs depending on whether the signals are being sent in the uplink direction (which is the UE 106 to TP 103 direction) or the downlink direction (which is the TP 103 to UE 106 direction). The modulation method used in the downlink direction is a multiple-access version of OFDM called Orthogonal Frequency-Division Multiple Access. In the uplink direction, Single Carrier Frequency Division Multiple Access is used.

According to OFDM schemes employed in an embodiment of the invention, orthogonal subcarriers are modulated with a digital stream, which may include data, control information, or other information, so as to form a set of OFDM symbols. The subcarriers may be contiguous or noncontiguous, and the downlink data modulation may be performed using quadrature phase shift-keying ("QPSK"), 16-ary quadrature amplitude modulation ("16QAM"), or 64QAM. Typically downlink control modulation is QPSK although other modulation schemes may be used too. The OFDM symbols are configured into a downlink subframe (typically of 1 millisecond duration) for transmission from the base station. Each OFDM symbol has a time duration and is associated with a cyclic prefix ("CP"). A cyclic prefix is similar to a guard period between successive OFDM symbols in a subframe, but its primary function is to render the data transmitted on different subcarriers orthogonal upon application of a Fast Fourier Transform ("FFT") in a receiver in a multipath fading channel. Typically, the legacy Rel-8/9/10 control channel ("PDCCH") is transmitted in the first few OFDM symbols at the beginning of the subframe, and data are transmitted in the rest of the subframe on the LTE Uu downlink.

Figure 4:
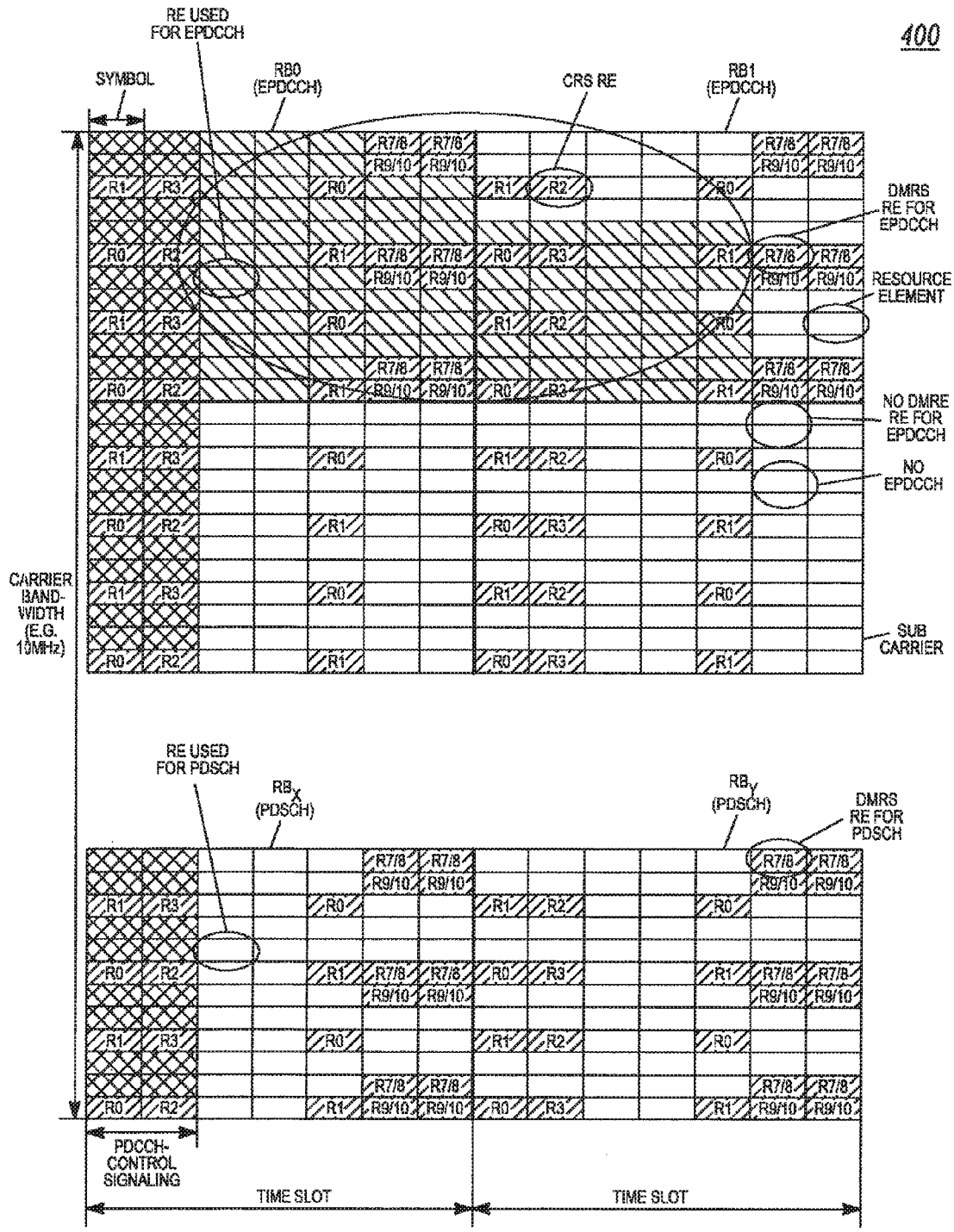
FIG. 4 is data-structure diagram of a representative radio subframe.

The data carried by the OFDM signals are organized into radio frames. Each radio frame typically includes ten subframes. An example of the structure of a subframe is shown in FIG. 4. FIG. 4 depicts a subframe 400 in the context of a time-frequency diagram. A vertical scale of the diagram depicts multiple blocks of frequency, or frequency bins (frequency subcarriers), of the subframe 400 that may be allocated for transmission. A horizontal scale of the diagram depicts multiple blocks of time (in units of OFDM symbols) of the sub-frame 400 that may be allocated. The subframe 400 comprises multiple resource blocks ("RBs") such as Resource Block 0 (RB0), Resource Block 1 (RB1), Resource Block 2 (RB2), and Resource Block 3 (RB3). Each RB comprises 12 OFDM subcarriers over a time slot comprising seven OFDM symbols for the normal CP case. Typically, the sub-frame duration is 1 ms, and it can comprise two time slots of 0.5 ms duration each. In turn, each RB can be divided into multiple resource elements ("REs"). Each RE is a single OFDM subcarrier, or frequency bin, on a single OFDM symbol. It is to be noted that many frames and subframes may be transmitted from the TP 103 to the UE 106 and vice-versa, and that various channels may occupy slots in many sub-frames. There are several types of reference signals ("RSs") used in LTE. The references signals are transmitted by the TP 103 to the UE 106 to enable the UE 106 to perform some function. One such function is for the UE 106 to determine channel-state information ("CSI") that the UE 106 reports to the TP 103. In one embodiment, the CSI that the UE 106 reports includes a Channel Quality Indicator ("CQI"), a Pre-coding Matrix Indicator ("PMI"), and a Rank Indicator ("RI"). The CQI tells the TP 103 information about the link adaptation parameters that the UE 106 can support at that time, taking into account the transmission mode, the receiver type of the UE 106, the number of antennas being used by the UE 106, and the interference being experienced by the UE 106. In one embodiment, the CQI is defined by a sixteen-entry table with Modulation and Coding Schemes ("MCS"). The UE 106 reports back to the TP 103 the highest CQI index corresponding to the MCS and Transport Block Size for which the estimated received download transport Block Error Rate ("BLER") (e.g., the ratio of blocks sent with transmission errors to total blocks sent) does not exceed 10%. PMI indicates to the TP 103 the codebook element that the TP 103 could use for data transmission over multiple antennas. Finally, RI is the recommendation of the UE 106 to the TP 103 for the number of layers to be used in spatial multiplexing. The RI can have, for example, values of 1 or 2 with a 2-by-2 antenna configuration and from 1 to 4 with a 4-by-4 antenna configuration. Generally, the RI is associated with one or more CQI reports. In other words, the UE 106 calculates CQI assuming a particular RI value which indicates an index of an MCS that could be received on the PDSCH with a BLER≤0.1; PMI, which indicates a preferred precoding matrix for the PDSCH; and RI, which indicates a number of useful transmission layers (its rank) for the PDSCH.

To enable communication to occur smoothly, the TP 103 uses control signaling, including DL signaling via a DL control channel and uplink ("UL") signaling via a UL control channel. Downlink control signaling is carried by control channels. One such channel is the PDCCH which is located at the start of each downlink subframe (up to the first three OFDM symbols). Another, which is being introduced in LTE Rel-11, is the Enhanced Physical Downlink Control Channel ("EPDCCH") which is located on one or more RB pairs spanning both slots in the subframe . Each of these channels carries the downlink scheduling assignment, uplink scheduling grants, UL transmit power control commands, etc.

The control region of a downlink subframe comprises the multiplexing of all EPDCCH or PDCCH bits into a single block of data which is subsequently processed to form complex modulated symbols. These symbols are then divided to form blocks of complex-valued symbol quadruplets known as a resource element group ("REG"). These REGs are then interleaved and cyclically shifted prior to EPDCCH or PDCCH resource mapping.

The EPDCCH includes configuration information related to configuration of a control channel. According to an embodiment of the invention, EPDCCH supports increased control channel capacity, an ability to support frequency-domain Inter-Cell Interference Coordination ("ICIC"), an ability to achieve improved spatial reuse of control channel resource, an ability to support beamforming and diversity, and an ability to operate in Multicast/Broadcast over a Single Frequency Network subframe. A UE such as UE 106 (FIG. 1) can receive the EPDCCH in a set of RBs that may span only a portion of the carrier bandwidth in the frequency domain. As depicted in the subframe 400 of FIG. 4, the UE 106 may expect to receive the EPDCCH in RB0 and RB1, i.e., RB pairs spanning both slots of the subframe.

An EPDCCH or PDCCH is transmitted on one or on an aggregation of consecutive Control Channel Elements ("CCEs") or enhanced Control Channel Elements ("eCCEs"), where a CCE or an eCCE corresponds to 9 REGs. (It should be noted that EPDCCH may also be referred to using the term CCE.) Each REG contains 4 REs. Each CCE includes time-frequency REs within the RBs of the EPDCCH or PDCCH OFDM symbol set. The EPDCCH or PDCCH carries scheduling assignments and other control information in form of Downlink Control Information ("DCI") messages.

The subframe can also include other RSs such as a cell-specific reference signal ("CRS"), a positioning reference signal, a primary synchronization signal, and a secondary synchronization signal that are distributed in the control regions or user data regions of the sub-frame. These other RSs may be present but are not necessarily used for demodulation of received signals by a UE in an LTE-A communication system.

To monitor the radio quality of the TP to which the UE 106 is communicating (e.g., the "serving TP" in cellular networks), the UE 106 engages in Radio Link Monitoring ("RLM").

In Release-8/9/10 of 3GPP LTE, the UE Layer 1 or the physical layer conducts RLM, for the purpose of detecting radio link failure ("RLF") and radio link recovery. This is done by indicating a radio problem detection status or radio link quality to higher layers based on processing the CRS. In Rel-11 3GPP LTE, RLM may be based on TP-specific reference signals such as DMRS or CSI-RS. In non-Discontinuous Reception ("non-DRX") mode operations, such as when the UE is not in sleep mode, the UE in every radio frame checks the quality, measured over a time period, against thresholds (also known Qout and Qin) defined implicitly by relevant requirements for detecting out-of-sync ("OOS") and in-sync ("IS") conditions, where "sync" means synchronization. For every radio frame, the UE indicates radio problem detection to higher layers when the quality is worse than the threshold Qout and continues monitoring until either (a) the quality gets better than the threshold Qin or (b) nRLF is declared (after a certain timer expires) and the radio link recovery procedure is initiated following the suspension of all UL transmissions. Typically, when the serving TP (or serving cell) signal quality becomes bad, the UE may be handed over to another serving TP (based on measurements provided by the UE to the TP or network-aided measurements). However, for cases, e.g., where a UE is in a connected state to a serving TP (e.g., serving cell), but the UE suddenly experiences severe sustained quality degradation and cannot receive any messages from the serving TP, the UE cannot be handed over to a different serving TP. In such cases, a radio link failure occurs and radio link recovery procedure is considered useful.

Typically, the criteria for declaring that an RLF has occurred are defined based on whether or not a reference PDCCH BLER is achieved for a particular downlink control channel configuration. For example, for the Rel-8/9/10 LTE, the OOS is reported to the higher layers from the lower layers if a hypothetical or reference PDCCH BLER becomes greater than 10%, assuming the transmission of a DCI Format 1A at an eight CCE aggregation level, which, for example, corresponds to a small payload size DL assignment (used for scheduling data or broadcast control transmissions) with the highest code protection (due to using eight CCEs where eight is the maximum that can be assigned for a DCI). An IS condition is reported if the hypothetical or reference PDCCH BLER drops below 2%, assuming the transmission of a DCI Format 1C (with a certain different payload size) at a 4 CCE aggregation level, such as the downlink control message associated with (for scheduling) the transmission of a paging message or system information message (which may typically be broadcast information). In Rel-10 enhanced Inter-Cell Interference Coordination ("eICIC"), the TP (or serving cell) can further configure the UE to monitor the radio link quality in only a subset of sub-frames. Based on the OOS and IS events, if it is determined that the radio link quality is poor, then a RLF may be declared.

For behavior upon RLF detection, the LTE Rel-8 UE procedure for RLM does not involve network signaling (i.e., a UE RLF is deduced by the network by suspension of UE UL transmission after the expiry of a timer). But, with EPDCCH the UE sending an indication that an RLF has occurred can lead to measures for improving the EPDCCH link by the eNB such as a re-configuration of EPDCCH (e.g., changing antenna precoding coefficients associated with DMRS ports, EPDCCH power boosting, changing of the set of RBs configured for EPDCCH, etc.). Therefore, UE can indicate that an RLF has occurred to the eNB. The UE can suspend UL until the T310 expires and then attempt RRC connection re-establishment if the EPDCCH is not configured before the timer expires. Alternatively, the UE can continue transmission on the UL until the T310 timer expires and can stop UL transmission if EPDCCH is not re-configured and the timer expires. The ACK/NACK PUCCH resources available to the UE to transmit uplink signals can be configured via higher-layer signaling. Thus, if such resources are available, the UE may use those resources for sending an indication to the eNB that an RLF has occurred.

According to a related embodiment, the UE 106 can use a different method for OOS/IS condition based on the type of control channel that the UE 106 is monitoring. For example, when the UE 106 monitors the PDCCH, it can use the Cell-Specific Reference Signal (CRS) for RLM, and when the UE 106 is configured to monitor the EPDCCH, it can use the EPDCCH DMRS or CSI-RS for RLM. The configuration of the resources used for EPDCCH can be done via higher-layer signaling.

In order to provide the required data bandwidth, several carriers may be used in a process called carrier aggregation. Using this process, several carriers are aggregated on the physical layer to provide the required bandwidth. To an LTE terminal, each component carrier appears as an LTE carrier, while an LTE-Advanced terminal can exploit the total aggregated bandwidth.

Carrier aggregation enables bandwidth extension to support deployment of bandwidths up to 100 MHz. This is done by aggregating several carriers to provide a larger system bandwidth. It involves aggregating two or more component carriers ("CC"). An LTE advanced UE may simultaneously receive one or multiple CCs, depending on its capabilities, and it is possible to aggregate a different number of CCs of possibly different bandwidths in the UL and DL.

Figure 5:
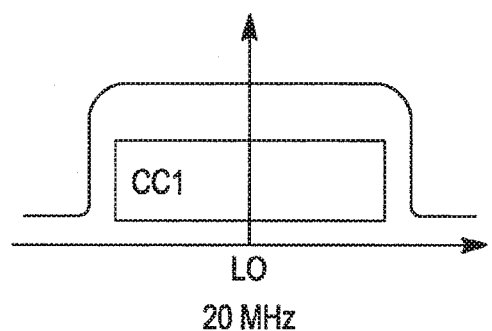
FIG. 5 is an illustration of a representative radio-frequency ("RF") filter usable in single-carrier operations.
Figure 6:
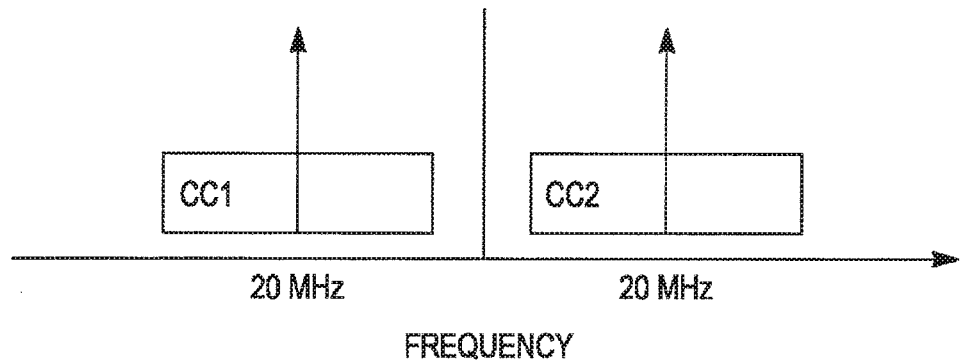
FIG. 6 is an illustration of representative RF filters usable in multiple-carrier operations.

With a single carrier operation, the RF filter of the UE is like that shown in FIG. 5. The UEs local oscillator (i.e., the carrier frequency) is located in the center of the CC. If multiple carriers are aggregated, like CC1 and CC2, as shown in FIG. 6, two RF transceivers can be used by the UE—one tuned to the first carrier, CC1, and the other tuned to the second carrier, CC2. The disadvantage of this is that two transceivers consume twice the power of one transceiver.

Figure 7:
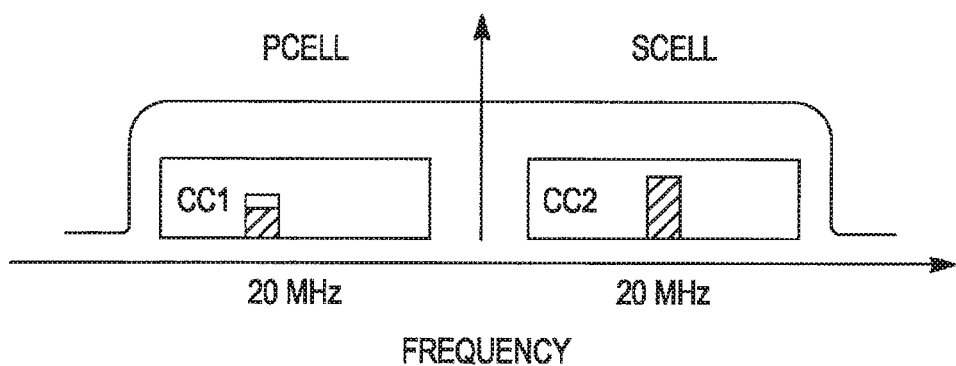
FIG. 7 is an illustration of multiple-carrier operations where the carriers are contiguous to one another.

In the example of FIG. 7, CC1 and CC2 are aggregated so as to be contiguous to one another in terms of frequency. CC1 and CC2 each occupy 20 MHz, and thus span a total of 40 MHz. The local oscillator ("LO") of the UE is located at the center as shown. It is to be noted that the space depicted between CC1 and CC2 is for ease of reference only, and, in fact, CC1 and CC2 are contiguous. In this architecture, the UE may only need one transceiver.

When carrier aggregation is employed, at least one of the TPs acts as the "primary cell" or Pcell, and the other TPs act as secondary cells or Scells. The Pcell is often referred to as the "anchor cell," and its carrier is often referred to as the "anchor carrier." The Pcell is the cell that operates on the primary frequency, to which the UE (1) performs an initial connection establishment procedure, (2) initiates the connection re-establishment procedure, or (3) is indicated as the primary cell in a handover procedure. The Scell, on the other hand, is a cell that operates on a secondary frequency, which may be configured once an RRC connection is established. The Scell may be used to provide radio resources (such as DL data) to supplement the resources provided by the Pcell. It is to be noted that when the carrier components are referenced herein, it will be assumed that CC1 originates from the Pcell and CC2 originates from the Scell.

From the perspective of each UE, each CC is associated to a PCell or to one or more SCells. Generally, from the PCell the UE receives security input and NAS mobility information for the RRC connection establishment and handover. The PCell assignment is generally UE-specific, and the change of PCell at each UE may be accomplished through a handover procedure. The PCell may be responsible for monitoring broadcast signaling of system information and transmission of random access channel and PUCCH.

A Pcell transmits CRS, which are transmitted on the entire bandwidth in a cell and are intended for all UEs in a cell. CRS are used by a UE for various purposes, such as for mobility measurement and data demodulation. The UE also uses the CRS to estimate the channel quality, from which CSI is derived. The UE generally reports CSI to the eNB, so that, for example, the UE can be moved from the TP it is currently associated with to a second TP that has a better signal quality. Other services provided by the Pcell include cell detection, cell ID, and cell ID timing SCells may carry the dedicated signaling information, such as PDSCH, PUSCH, and PDCCH. The PDCCH transmitted from a particular CC may contain the scheduling information on other CCs as well as its own CC. This enables the network to disperse a heavy load of PDCCH transmission. The Scell is complimentary to the Pcell and provides additional bandwidth to send the data. Scells do not have a CSS or common control signals, such as PBCH, the various types of System Information ("SI-x"), or a PBCH. The Scell does not have paging either. However, the Scell generally does transmit UE-specific information, and has a UESS, in which an EPDCCH is located.

According to an embodiment of the invention, a particular type of TP is now described. The terminology used for this TP is New Carrier Type ("NCT"). In CA schemes, an NCT acts as an Scell. In various embodiments of the invention, the NCT allows a reduction in how often the UE needs to receive the CRS, thereby reducing the UEs overhead. The various methods and apparatus for accomplishing this are described herein.

A phenomenon that occurs when CA is used in an embodiment of the invention is now described. This phenomenon is referred to as "power imbalance," and is discussed with reference to FIG. 7. In FIG. 7, which depicts signals received by the UE, there is a signal received on CC1 (which originates from the Pcell) and a signal that is received on CC2 (which originates from the Scell). The signal on CC2 generates a corresponding signal on CC1 whose frequency is the mirror image of the signal on CC2, and whose magnitude is proportional to the power of the signal on CC2. This mirror signal is referred to as the "image signal" (shown as the diagonally-lined rectangle). If the power of the signal on CC2 is significantly greater than the power of the signal on CC1—referred to as a "power imbalance"—then the image signal will be nearly as powerful as the signal received on CC1, and the image signal will interfere with the signal on CC1. There are certain scenarios in which the power imbalance that leads to this interference is more likely. FIGS. 8*a* through 8*e* depict possible scenarios.

Figure 8A:
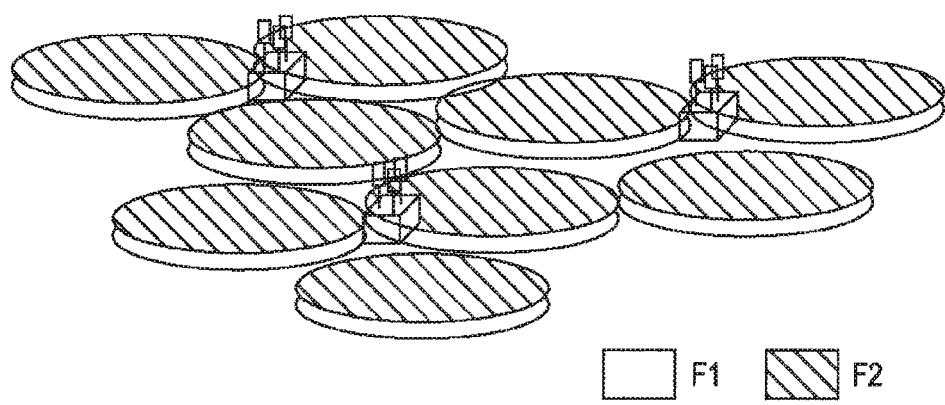
FIGS. 8*a* through 8*e* are example scenarios of "power imbalance" where an image signal can interfere with a component-carrier signal.

In the scenario of FIG. 8a, F1 and F2 cells are co-located and overlaid, providing nearly the same coverage. Both layers provide sufficient coverage, and mobility can be supported on both layers. This is a likely scenario when F1 and F2 are of the same band, e.g., 2GHz. It is expected that aggregation is possible between overlaid F1 and F2 cells.

Figure 8B:
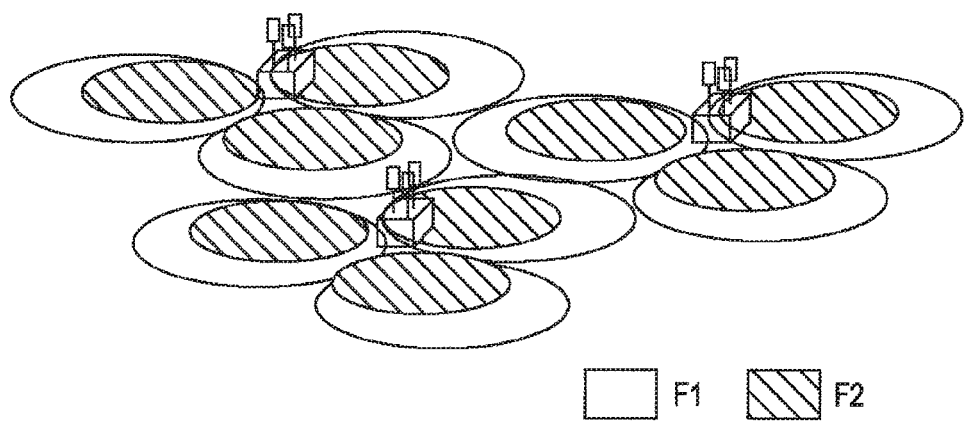

In FIG. 8b, F1 and F2 cells are co-located and overlaid, but F2 has smaller coverage due to larger path loss. Only F1 provides sufficient coverage, and F2 is used to provide throughput. Mobility is performed based on F1 coverage. This is a likely scenario when F1 and F2 are of different bands. It is expected that aggregation is possible between overlaid F1 and F2 cells.

Figure 8C:
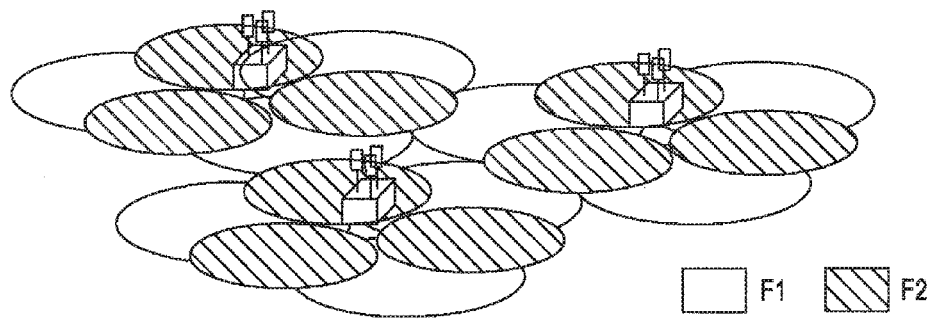

In FIG. 8c, F1 and F2 cells are co-located, but F2 antennas are directed to the cell boundaries of F1 so that cell-edge throughput is increased. F1 provides sufficient coverage, but F2 potentially has holes, e.g., due to larger path loss. Mobility is based on F1 coverage. This is a likely scenario when F1 and F2 are of different bands. It is expected that F1 and F2 cells of the same eNB can be aggregated where coverages overlap.

Figure 8D:
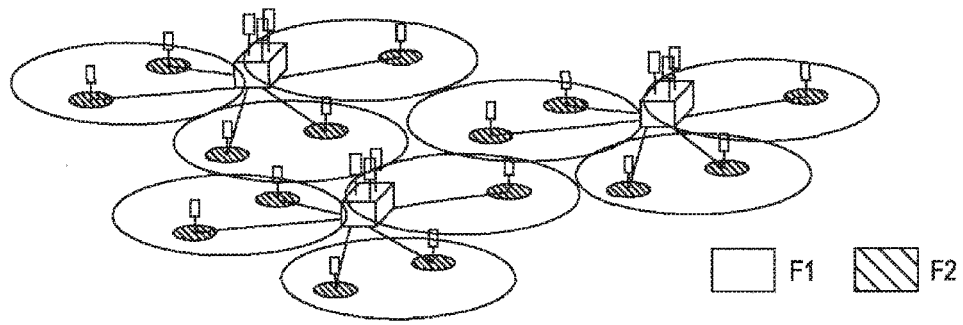

In FIG. 8d, F1 provides macro coverage, and on F2 RRHs are used to provide throughput at hot spots. Mobility is performed based on F1 coverage. This is a likely scenario when F1 and F2 are of different bands. It is expected that F2 RRH cells can be aggregated with the underlying F1 macro cells.

Figure 8E:
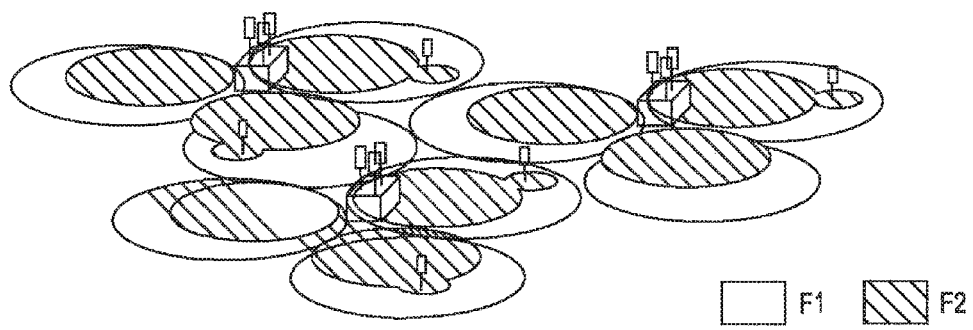

The scenario of FIG. 8e is similar to that of FIG. 8b, but frequency-selective repeaters are deployed so that coverage is extended for one of the carrier frequencies. It is expected that F1 and F2 cells of the same eNB can be aggregated where coverages overlap.

An example of how power imbalance can cause non-compliance with a standard is now described. In LTE Rel-10, RAN4 requirements support up to −25 dBc image due to IQ gain/phase imbalance while receiving both Pcell and Scell within the same FFT window. This translates to up to a maximum allowed limit of 6 dB power imbalance between Pcell and Scell for a target SNR of 19 dB on either CC. In Rel-10, suitable re-configuration of Pcell (i.e., changing the Scell CC to Pcell) leads to avoidance of this problem. But, since NCT is not a standalone carrier, this type of re-configuration is not possible for Rel-11 if Scell is an NCT. Assuming 25 dBc protection between Pcell and Scell for intra-band CA operation, >0 dB SNR can be guaranteed as long as the Pcell/NCT Scell imbalance is <25 dB. Of course, if the imbalance is large, only smaller MCS can be scheduled on the Pcell due to the interference arising out of the large received power on the NCT Scell. But, even at 0 dB SNR, reliability of SI-x and Paging might be low. The problem then arises as to how the UE can continue to receive critical common control in a large power Pcell in light of NCT Scell power imbalances and still remain connected to the Pcell.

It is to be noted that the problem of power imbalance is described in terms of the Scell being an NCT. However the same problem could occur if a network is not equipped to have PCell capabilities on an SCell frequency, even when the SCell is not an NCT carrier. For example: PCell operation requires mobility management on the PCell frequency and corresponding measurements report reception/processing. A network may prefer to restrict the PCell to only one frequency and thus not have the capability to make the SCell a PCell. As alluded to previously, in many of the embodiments described herein all of the dedicated traffic for the UE (C-RNTI based PDCCH and PDSCH in UESS) is scheduled via the SCell. However, the UE may still have to receive some broadcast signaling from the PCell. For example,

- the UE may need to receive system information change indications (transmitted in paging messages) or
- the UE may need to receive indications of presence of Earthquake and Tsunami Warning System (ETWS), Commercial Mobile Alert System (CMAS), SIBs, etc. (transmitted in paging messages on the PCell).

Furthermore, if a change of system information of presence of ETWS/CMAS SIBs is indicated, the UE may need to acquire the relevant broadcast SIBs (MIB, SIB1, SIB2, and SIB10-12 as required).

In summary, these are examples of things the UE may need to get from the Pcell as it may not be able to get them from the Scell.

A procedure that the UE may perform to receive a broadcast signaling on the PCell is now described.

1. The UE identifies "paging occasions," i.e., opportunities at which the UE can cease listening to the Scell and listen only to the Pcell. Put another way, the UE will determine subframes on which the UE will check for paging messages on the Pcell (e.g., for SI change indication and indications of presence of ETWS/CMAS SIBs). The UE does not have to read subframes of the Pcell on every paging occasion.

Figure 9:
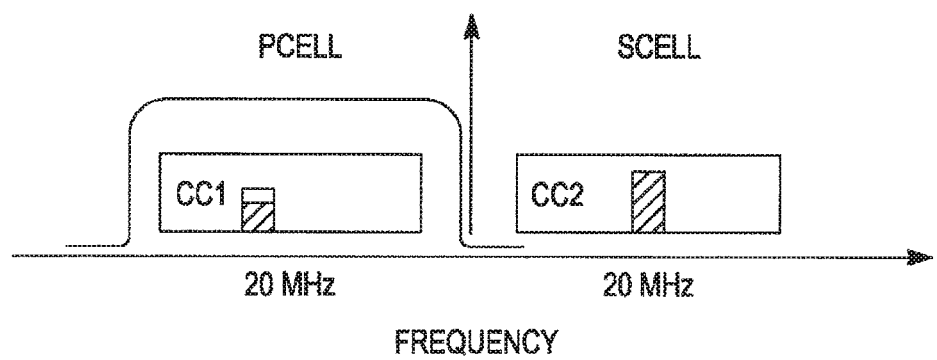
FIG. 9 is an illustration of a UE tuning downlink ("DL") bandwidth to cover only the PCell bandwidth.
Figure 10:
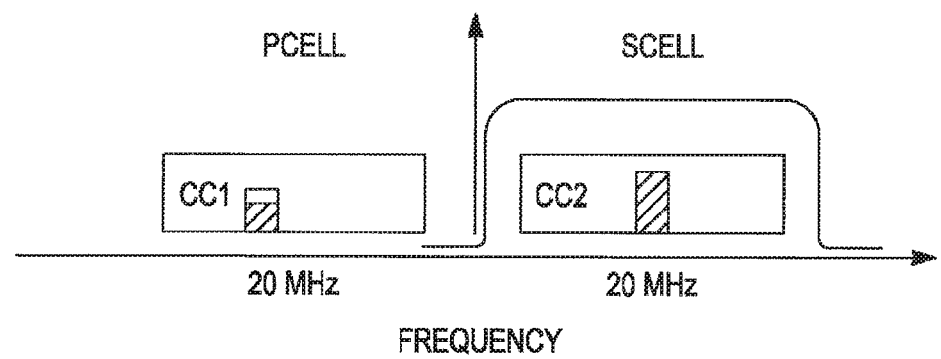
FIG. 10 is an illustration of a UE tuning DL bandwidth to cover only the Scell.

2. In the subframe just before a paging occasion, the UE decreases DL bandwidth (e.g., by changing the filter) to include just PCell bandwidth, as shown in FIG. 9. Making this switch may cause the UE to experience a "glitch." During the paging occasion, the UE receives a paging message from the Pcell if a paging message is present. Once the paging message is received by the UE, the UE increases bandwidth (e.g., by changing the filter) to include both the PCell and the SCell bandwidth, as shown in FIG. 7. This expansion of bandwidth causes the UE to experience another "glitch."

a. The "glitch-PCell reception-glitch" events cause what is referred to as an "Scell gap." Scell gap refers to the period of time during which the UE cannot receive transmissions from the Scell. The UE experiences an Scell gap when initiating a switch from the one cell to another (e.g., from the Scell to the Pcell), during the intermediate period of time when the UE cannot receive transmissions from either cell, and during the time that the UE is initiating the beginning of reception of the second cell. There are two kinds of gaps. In one kind, the eNB can schedule the gap (e.g., its periodicity and gap duration). In the other kind, the UE can schedule by itself, which is referred to as an autonomous gap. If the UE schedules an autonomous gap, the eNB does not even know there is a gap. In cases where the gaps are relatively infrequent, then there are likely no adverse consequences when the UE schedules autonomous gaps. This is because if the UE misses DL reception (no ACK, NACK) and the eNB does not get any response from UE, the eNB just retransmits. If, however, the gaps happen too often, then traffic is disrupted and the eNB will experience anomalies. The link will have bad qualities, and the MCS level will drop, reducing the data throughput.

Before an SCell gap, the UE is receiving transmission from both the PCell and SCell. In the first subframe of the SCell gap, the UE receives neither PCell nor SCell transmissions. In the second subframe, the UE receives PCell transmission only (i.e., paging transmissions). In the third subframe, the UE receives neither PCell nor SCell transmissions.

3. If, when the UE switches to listening to the Pcell only, there is an indication of change of SI or the presence of ETWS/CMAS SIBs, the following two options for receiving the relevant SIBs are possible:

a. In response to receiving the SI change indication, at the start of the next modification period, the UE may retune the DL to just the PCell bandwidth. The UE then receives relevant system information in the modification period and then retunes the DL to just the SCell bandwidth at the end of the modification period (or earlier). This is equivalent to "deactivating" the SCell for the duration of the modification period. By way of explanation, the "modification period" is a window of time specified by the cell during which SI normally changes. The modification period generally occurs at specific radio frames. The time of the modification period is communicated to UE by a cell via an RSC message when the UE attaches to the cell. Note that ETWS and CMAS signals do not involve the UE waiting for the modification period, as these are urgent messages. In these cases, the UE will immediately receive the new system information.

For example, if the UE receives a page that indicates that SI-5 has changed, it will receive the new SI-5 information during the next modification period. During the next modification period, the UE will attempt to receive the new SI-5. This SI-5 is dynamically scheduled. UE does not know which subframe and RB it is scheduled for, so within the SI window, UE will try to decode the PDCCH, which indicates the RB and subframe on which the SI-5 is transmitted. The SI-5 is transmitted multiple times, so the UE has multiple opportunities to receive the new SI-5.

For reception of MIB and SIB1 (which are in subframes known a-priori), the UE uses the same SCell gap approach. For reception of other SIBs, the SCell gap is longer (to cover the SI scheduling window). MIB and SIB1 will be scheduled first, and they are not dynamically scheduled. They are known a priori. In one embodiment, the MIB has 40 ms period, the SIB1 has 80 ms period and is scheduled on subframe 5. MIB and SIB1 uses the Scell gap approach, while with respect to the other SIBs, the Scell gap is longer because the UE does not know where the SIBs are and so must listen for the whole SI scheduling window.

Furthermore, given that the PDSCH scheduling will occur entirely on the SCell, it would be beneficial to have the UE reduce its bandwidth to just the SCell bandwidth for normal operation. The UE can receive broadcast signaling on PCell using an autonomous gap approach. To accomplish this:

1. the eNB may indicate to the UE that it will be scheduled only on the SCell. This can be based on the UE first reporting to the network the PCell/Scell imbalance, or it can be based on RSRP measurements received at the eNB. If there is a power imbalance, the UE tells eNB about the imbalance, indicating that Pcell reception is not very good. The eNB may the switch the UE to the Scell for data communication.
2. In response to the indication from the eNB, the UE reduces its bandwidth to just the SCell bandwidth, for normal operation. This puts the UE's reception of the PCell transmissions in a "semi-active" state, even when the SCell is activated. In this case, the UE does not have any DRX (discontinuous reception) related actions on the PCell. This is a way for the UE to reduce the power consumption. If there is no remaining transmission due to rescheduling, the UE can go into a semi-active state.
3. For reception of critical indications (i.e., paging) from the PCell, the UE uses autonomous gaps.

In the following section three types of measurements are considered: CQI, Radio Resource Management ("RRM") (RSRP, RSRQ), and measurements for radio link monitoring. Two power imbalance regimes can be envisioned (specifically, for the scenario of FIG. 8d).

Small-medium power imbalance: In this regime, the power imbalance is small enough so that PDCCH quality on Pcell is sufficiently high, and accordingly, there is no RLF (e.g., Scell–Pcell receive power difference is <15 dB). However, there is some degradation with respect to P-RNTI reception to necessitate re-tuning to Pcell as described in Solution 1.

Given that the intention is to avoid scheduling the PDSCH on the PCell when the SCell is not in the gaps, no changes are needed to CSI measurements (i.e., CSI should reflect the interference seen due to the SCell image). So a low CQI on the Pcell will have an acceptable impact. In other words, when there is a small to medium power imbalance, the resulting interference is tolerable for RRM and RLM.

Furthermore, the subframes on the Pcell that overlap with the gaps can be excluded from interference averaging for CQI/PMI/RI computation. The impact of the power imbalance (i.e., the Scell image) on RRM and RLM would be:

RRM measurements: These are used for mobility purposes (i.e., to determine when to initiate handover procedures to move the UE from one cell to another), the power imbalance (i.e., the Scell image) should have no impact.

RLM measurements: These are used to determine RLF conditions and abandon the serving cell. Interference due to SCell image would not be eliminated by going through an RLF procedure. Therefore, RLM measurements should not be affected by the SCell image.

Put another way, during Scell gaps, there is no interference from the Scell, so the Pcell CQI will be high on those subframes. But the Scell gap is a temporary condition and it is not desirable to have a temporary condition impact the Pcell CQI reporting. So the RLM and RRM measurements will exclude those subframes in the Scell gap to avoid throwing off the average.

Large power imbalance: In this regime, the power imbalance is large (>15 dB) so that RLF on Pcell becomes an issue unless special measures are taken. When the power imbalance is large, in addition to the Scell IQ image falling on Pcell RBs reducing the achievable SNR on Pcell, the limited ADC bitwidth leads to a certain upper limit on the achievable SNR. This SNR upper limit decreases with increasing power imbalance.

If the power imbalance is high, the interference (Scell image) will be high. However, the UE should not drop the call with the cell, but because of this interference, it will experience RLF. As a result, the UE would establish an RLC connection with a different cell. But based on geometry and the UE location, the current cell is actually the most appropriate cell for this UE. It is therefore undesirable for the UE to be handed over to a different cell. So for this radio link monitoring and this RLM measurement, the Scell interference should be excluded to keep it from impacting radio link monitoring.

More specifically, a large power imbalance can be addressed by partitioning the CSS (which is sent via the PDCCH on the Pcell) and the UESS (which is sent via EPDCCH on Scell). To do this the UE performs RLM (and special CQI/PMI/RI measurements) on the Pcell (based on either autonomous or eNB-scheduled gaps). However, during RLM on the Pcell, there will be Scell gaps. To adjust for these gaps, the UE can additionally perform RLM on the Scell UESS. So UE can then combine the PDCCH performance on the Pcell (monitored on CSS) with the EPDCCH performance on the Scell (monitored on UESS). "Monitoring performance" includes monitoring the performance of the control channel (PDCCH or EPDCCH) and determining IS or OOS condition. To reiterate, the UE monitoring the Pcell on the CSS for the PDCCH has an Scell gap, but the UE monitoring the Scell on the UESS does not have an Scell gap—the UE always monitors UESS. Therefore, the control signal quality is measured on both Scell and Pcell.

To implement this large-imbalance procedure in an embodiment of the invention, the UE retunes to the Pcell more often than in the case of the small/medium-imbalance procedure. In other words, instead of retuning to the Pcell just once every paging occasion, the UE can do it more often. For example, the UE can re-tune to the Pcell M (>1) times every paging occasion (scheduled by the eNB) and perform measurements as follows.

1. SCell DL gaps can be created such that they are configured (i.e., with subframe offset and periodicity) to include the paging occasions (Pos) while the re-tuning to the Pcell is carried out M (>1) times every paging occasion. For example, if the POs are on subframe 4 for a given UE, the SFN within which PO occurs is SFN1 (=SFN mod T=(T div N)*(UE_ID mod N)), and the PO periodicity is T (×10 ms). The Pcell re-tuning gap can be scheduled with periodicity T/M, where M is an integer (e.g., T=1280 ms and M=4 leading to gap periodicity of 320 ms). If SFN1=62 is the SFN offset, the gap schedule then is SFN2=rem (SFN1, T/M/10)=30. The UE can lose up to 3*M subframes every paging occasion considering the time needed for RF retuning But since different UEs have different PO offsets, the loss due to the gaps are not system wide (similar to inter-frequency measurement gaps).
2. Since the UE is operating in a regime where there is higher incidence of RLF if the UE performs OOS/IS detection on subframes that experience Scell desense, the UE will restrict interference measurements relating to OOS/IS detection to subframes after re-tuning (while only the Pcell is being received). In order to ensure there is sufficient reliability, the Pcell sampling interval may be sufficiently small (e.g., T/M=40 ms should be sufficient leading to 5 samples for Qout determination within a Teval, Qout=200 ms).
3. Also, since the UE re-tunes more frequently, it would be beneficial to schedule the UE on the Pcell in the gaps where DL subframes have better signal quality as compared to subframes where both Pcell and Scell are being received. Thus, there is a benefit in estimating and reporting CQI/PMI/RI separately for subframes outside the gaps (lower SNR) and subframes within the gaps (higher SNR) for the Pcell.

For example, the Scell gap is 1280 ms. Within the 1280 ms, there are four measurements. Thus, the gap period is reduced from 1280 ms to 320 ms. The reason for this is to guarantee a certain level of measurement accuracy, a measurement of 4 or 5 times within 200 ms is beneficial. Because of a higher measurement frequency, the UE will exclude the interference during the measurement period. In other words, during Scell gaps, Scell measurements of CQI are not useful, so the UE can exclude EPDCCH measurements during that time and focus on PDCCH in Pcell.

To summarize:
i. Scell gaps are used for Paging reception on the Pcell for low-medium power imbalance. RRM and RLM measurements are carried out on the Pcell on all subframes (unrestricted) since the assumption is that Scell interference to Pcell is small enough not to impact RRM and RLM.

ii. Scell gaps are used for Paging reception, RSRP/RSRQ measurements and OOS/IS (RLM) evaluation for large power imbalance. The UE is operating in a regime where either the RRM measurements are degraded or the UE can declare RLF or both due to Scell image if the UE does not perform measurements when it is re-tuned to Pcell only. To ensure, sufficient reliability of RRM and RLM measurements, it is desirable for the UE to sample Layer 1 3 to 5 times every 200 ms when the UE is in connected non-DRX state.

Figure 11:
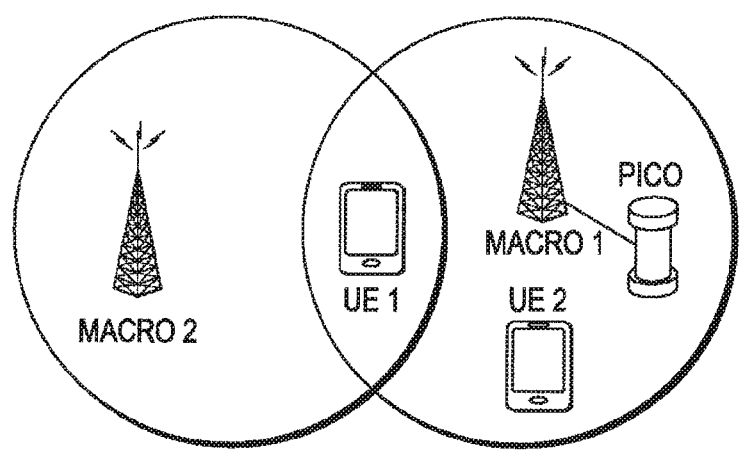
FIG. 11 is an overview of a representative network with two macrocells and one picocell.

One motivation for this small/medium-interference and large-interference scheme can be illustrated in the following example, described in conjunction with FIG. 11. In FIG. 11, there are two macrocells, labeled Macro 1 and Macro 2. Both of these cells act as Pcells. Within the range of Macro 1 is an RRH linked to the TP of Macro 1 by a high speed connection (e.g., fiber optic). This RRH is a picocell and acts as an Scell. There are also two UEs—UE 1 and UE 2. UE 2 is in range of the picocell, while UE 1 is in range of both Macro 1 and 2. Both UE 1 and 2 are attached to Macro 1. In traditional handovers, UE 1 would see strong interference from Macro 2. This interference would be measured by UE 1, and UE 1 would report this interference to eNB (Macro 1). The eNB would determine that it would be best to handover UE 1 to Macro 2.

However, UE 2 is located close to the picocell. There is weaker power from Macro 1, but strong power from the picocell. In this case, the UE should stay attached to Macro 1 and should not be handed off to Macro 2. So when UE 2 measures the CS RSRP for Macro 1, the interference measured does not help for the UE's mobility cell selection. UE 2 should still attach to Macro 1 even though the Macro 1's RRP is low. But although the RSRP is low, Macro 1 does not know why the RSRP is low. Macro 1 might initiate a handover incorrectly. If a handover occurred, and UE 2 measures the RSRP for Macro 2, it would also be low. Macro 2, upon receiving the report from UE 2, would then hand UE 2 back over to Macro 1 again. The result is like a ping-pong effect. This instability results in a throughput drop for UE 2. Therefore, it is appropriate to exclude the Scell image interference from the measurements taken by UE 2.

In an embodiment of the invention, the Scell gap is included for low-medium power imbalances. The Scell gap is only used for paging reception. For high power imbalance levels, the Scell interference is excluded from mobility handover decisions or for cell reselection decisions. If it is not excluded, then the UE may unnecessarily go through incorrect handovers and even experience RLF decorrelation.

The Scell gap is used for RRM measurements and RLM evaluation. Measurement occurs more frequently compared to paging reception—e.g., 4 or 5 times every 200 ms (because there is a measurement accuracy requirement in the AN specification). And because this occurs often, it is desirable for the eNB to schedule the gap. Scell interference is used because the intention is not to schedule in the Pcell. In other words, because Scell gap occurs often, the Scell usability becomes lower. In that case, it is desirable to use Pcell for PDSCH transmission when a Scell gap occurs. Because of the Scell gap, Pcell quality becomes better.

When there is no Scell gap, the UE uses a first set of subframes over a first bandwidth from an Scell. When there is an Scell gap, the UE uses a second, distinct, set of subframes on a second bandwidth from a Pcell. During the Scell gap, the Pcell CQI is higher, and then the eNB can schedule the data PDSCH for Pcell. So for the CQI estimation, the computations for first and second subframes are kept separately, as they have two different interference levels. It is possible, for example, for the eNB to drop the Scell based on the quality reported by the UE to the eNB.

When the power of the Scell reception is high, the Scell image interference level may be almost as high as the Pcell reception. To address this problem in an embodiment of the invention, if the eNB knows that the UE is supposed to receive a paging message on certain subframes, the eNB may drop the transmit power of the Scell to the UE or may possibly turn it off. By doing so, eNB can protect paging information on CC1, which may protect important system information.

However, the eNB does not necessarily know what the UE architecture is. So if the UE is a two-transceiver architecture (for which the Scell image problem is not as much of an issue), doing this would just be a waste of resources For example, instead of 20 mHZ and 20 Mhz for CC1 and CC2, assume that CC1 has a bandwidth of 10 Mhz and CC2 has a bandwidth of 20 Mhz. In this case, the "center" will be 15 Mhz from the left edge, and the UE would likely retune the LO to that position. The eNB would have no idea where the UE has put the LO, as the UE generally has a great deal of latitude as to where to put the LO. Thus, if the eNB signals to the UE that the eNB is reducing the transmit power of the CC2 signal or blanking the RB on which the CC2 signal is located (in order to protect the CC1 signal). The eNB may also tell the UE where to retune the LO—e.g., to the old center. The eNB also signals to the UE the location of the subframe in CC1 that the eNB will use to transmit system information, as well as where the UE should retune its LO (in order to protect the signal on the CC1).

More specific aspects of this embodiment of the invention are now described.

The eNB may use a reduced transmit power on the Scell in those subframes in which UE is expected to receive from the Pcell. The reduction in transmit power may be such that receive power difference between Scell and PCell at the UE would be within 6 dB.

The power reduction affects all UEs operating on the SCell. Power reduction generally causes a system-wide throughput loss. The eNB should therefore reduce the transmit power on NCT Scell as soon as one starts experiencing Pcell/Scell power imbalance which means that transmit power to all UEs are reduced. Therefore, it is desirable to minimize the occasions when it is applied. The network will preferably coordinate between the PCell and SCell such that:

1. The UE is ordered to look for paging (for SI change indication, emergency indications) in specific paging occasions. Ideally all UEs configured with CA would use the same occasions.
2. In those subframes, the SCell power is reduced, so UE is able to receive the PCell signal.

In an embodiment of the invention, one mechanism to do this would be as follows: The network signals subframes in which SCell power reduction may be applied. The UE then looks for paging in those subframes.

In addition to SCell power reduction, SCell RB muting on the reduced power subframes can be applied to protect paging/MIB/SIB. If intra-band contiguous carrier aggregation results in a symmetric component carrier arrangement (e.g., 10 MHz+10 MHz), then the eNB can assume that all UEs with a single-RF chain have an LO tuned to the center frequency of the aggregated BW. That is, eNB will know exactly which SCell RB allocation would cause the image falling on MIB/SIB/paging. Depending on the percentage of UEs suffering from large power imbalance in the system, eNB can decide whether to schedule PDSCH on SCell or not along with MIB/SIB on PCell. For a more flexible approach, the eNB could identify the RBs on which subframes are muted (for example, the eNB can signal a time-frequency mask for muted RBs with a certain time re-use or repetition duration). The UE may use this information to place the LO frequency such that the IQ image of the muted RBs on the Scell fall on the Pcell RBs that need to be protected. Typically, the IQ image falls on a region that is a mirror image about the LO frequency.

For PDSCH transmissions to the UE on the Pcell, there may be a pattern of subframes in which Scell applies reduced transmit power (and PDSCH from the Pcell to the UE can be scheduled).

The eNB potentially could reduce transmit power on only some subframes (e.g., subframes 0/4/5/9), and additional signaling (e.g., rho_A for RP-ABS which is being discussed for FeICIC) can let the UE know that the power has been reduced in some subframes. But, if CRS (from R0) is transmitted on any of these subframes on the NCT Scell, the eNB may still be subject to dynamic range restrictions, and the power reduction will be limited (6 dB for QPSK, 3 dB for 16QAM and 0 dB for 64QAM). Such limited power reduction may not be very useful when in the context of power imbalance of the order of 25 to 30 dB. One option is to not transmit CRS R0 on subframes 0/4/5/9 of the NCT Scell but rather offset in time so that power reduction on NCT Scell on the relevant subframes are not subject to the dynamic range restrictions. Even so, if there is power reduction on subframes 0/4/5/9 in all radio frames, there can be significant system-wide throughput loss. Thus, power reduction scheme will preferably be applied when a large number of UEs in the system suffer from power imbalance such as that in the scenario of FIG. 8d.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for receiving control signaling from a first cell operating on a first carrier when configured with at least the first carrier and a second carrier, the method comprising:
   operating on a first bandwidth that includes the first carrier and the second carrier;
   receiving scheduling information associated with a periodicity and a gap duration;
   identifying a paging occasion where the first bandwidth may be reduced to a second bandwidth;
   reducing bandwidth, based on the identified paging occasion, for the identified gap duration in each period of the periodicity, to a second bandwidth, the second bandwidth including the first carrier;
   increasing bandwidth, after the identified gap duration, to the first bandwidth; and first bandwidth, wherein each time instant of the second sequence follows a
   receiving control signaling from the first cell in frames occurring during the gap duration.

2. The method of claim 1 further comprising:
   receiving neither the signals on the first carrier nor the signals on the second carrier during a period immediately preceding the period of the identified periodicity; and
   receiving neither the signals on the first carrier nor the signals on the second carrier during a period immediately following the identified gap duration.

3. The method of claim 1 wherein the control channel is selected from the group consisting of: paging channel, SI-x, and PBCH.

4. The method of claim 1 further comprising:
receiving a paging signal indicating a system change notification; and
reducing the bandwidth to the second bandwidth in response to receiving the system change notification.

5. A method in a UE, the method comprising:
identifying a paging occasion where a first bandwidth may be reduced to a second bandwidth;
receiving scheduling information associated with a periodicity and gap duration of a transition from a first set of subframes to a second set of subframes;
receiving the first set of subframes and the second set of subframes, wherein:
  (i) a transition from the first set of subframes to the second set of subrames occurs at the periodicity of transition from the first set of subframes to the second set of subframes;
  (ii) the first sets of subframes are received over a first bandwidth that includes both a Pcell and an Scell and the second set of subframes are received over a second bandwidth that includes only the Pcell; and
  (iii) reducing a bandwidth, based on the paging occasion for the gap duration in each period of the periodicity, from the first bandwidth to the second bandwidth at the transitions between the first set of subframes and the second set of subframes wherein further, neither the first carrier nor the second carrier is received over a third sest of subframes;
estimating CQI/PMI/RI for the Pcell to generate a first CQI/PMI/RI metric, wherein the CQI/PMI/RI is determined based on a first interference estimate for the first set of subframes;
estimating CQI/PMI/RI for the Pcell to generate a second CQI/PMI/RI metric, wherein the CQI/PMI/RI is determined based on a second interference estimate for the second set of subframes; and
transmitting the first CQI/PMI/RI metric and the second CQI/PMI/RI metric.

6. The method of claim 5 wherein the UE estimates the first CQI/PMI/RI metric and the second CQI/PMI/RI metric when the power difference between the Pcell and the Scell exceeds a threshold.

7. A method in a UE, the method comprising:
identifying a paging occasion where a first bandwidth may be reduced to a second bandwidth;
receiving scheduling information associated with a periodicity and gap duration of a transition from a first set of subframes to a second set of subframes;
operating over the first bandwidth to receive a first Pcell carrier and a second Scell carrier in the first set of subframes;
reducing bandwidth, based on the paging occasion for the gap duration in each period of the periodicity, to operate over the second bandwidth to receive only the first Pcell carrier in the second set of subframes for the identified gap duration; and
performing a first set measurements only while operating over the second bandwidth in the second set of subframes.

8. The method of claim 7 wherein the UE operates over the second bandwidth when the power difference between the first and the second carrier exceeds a threshold.

9. The method of claim 7 wherein the first set of measurements comprise determining OOS/IS events towards radio link monitoring.

10. The method of claim 7 wherein the first set of measurements comprise estimating at least one of a RSRP, RSSI and RSRQ.

11. A method in a base station to enable a mobile station to receiving control signaling, the method comprising:
configuring the mobile station to operate on a first carrier and a second carrier;
indicating to the mobile station scheduling information associated with a periodicity and a gap duration where the mobile station may reduce bandwidth for the indicated gap duration in each period of the indicated periodicity;
transmitting control signaling, on the first carrier, in frames occurring during the gap duration; and
transmitting signals at a reduced power, on the second carrier, during the gap duration.

12. The method of claim 11 further comprising:
receiving measurement information, from the mobile station, indicating measurements of the first carrier and second carrier; and
transmitting signals at a reduced power on the second carrier, if the measurements indicate a substantial power imbalance between the first carrier and the second carrier.

* * * * *